US011529035B2

(12) United States Patent
Leffler et al.

(10) Patent No.: US 11,529,035 B2
(45) Date of Patent: Dec. 20, 2022

(54) SEPARATION SYSTEM FOR VACUUM CLEANER AND VACUUM CLEANER COMPRISING THE SEPARATION SYSTEM

(71) Applicant: Aktiebolaget Electrolux, Stockholm (SE)

(72) Inventors: Jens Leffler, Stockholm (SE); Johan Spång, Stockholm (SE)

(73) Assignee: Aktiebolaget Electrolux

( * ) Notice: Subject to any disclaimer, the term of this patent is extended or adjusted under 35 U.S.C. 154(b) by 542 days.

(21) Appl. No.: 16/480,891

(22) PCT Filed: Feb. 6, 2017

(86) PCT No.: PCT/EP2017/052527
§ 371 (c)(1),
(2) Date: Jul. 25, 2019

(87) PCT Pub. No.: WO2018/141412
PCT Pub. Date: Aug. 9, 2018

(65) Prior Publication Data
US 2021/0052122 A1    Feb. 25, 2021

(51) Int. Cl.
*A47L 9/16* (2006.01)
*B04C 3/06* (2006.01)
*B04C 3/00* (2006.01)

(52) U.S. Cl.
CPC .......... *A47L 9/1608* (2013.01); *A47L 9/165* (2013.01); *A47L 9/1666* (2013.01); *B04C 3/06* (2013.01); *B04C 2003/006* (2013.01)

(58) Field of Classification Search
CPC ...... A47L 9/1608; A47L 9/165; A47L 9/1666; A47L 9/1691; A47L 9/16; A47L 9/1683; B04C 3/06; B04C 2003/006
USPC ......................................................... 15/347
See application file for complete search history.

(56) References Cited

U.S. PATENT DOCUMENTS 2,664,966 A * 1/1954 Moore ...................... B04C 3/00
                                                        55/456
4,008,059 A * 2/1977 Monson ................. B01D 45/14
                                                        55/396
(Continued)

FOREIGN PATENT DOCUMENTS

CN        101310668 A    11/2008
EP          0815788 A2    1/1998
(Continued)

OTHER PUBLICATIONS

Japanese Notice of Reasons for Refusal for Japanese Application No. 2019-537186, dated Dec. 23, 2020, 5 pages.
(Continued)

*Primary Examiner* — Joseph J Hail
*Assistant Examiner* — Caleb Andrew Holizna
(74) *Attorney, Agent, or Firm* — RatnerPrestia (57) ABSTRACT

A vacuum cleaner separation system having: a cyclone tube having a cyclone chamber and an inner wall having a substantially cylindrical appearance defining a center axis; an inlet channel offset with respect to the center axis for receiving dust laden air; a dust outlet for discharging dust from the cyclone tube; an air outlet for discharging air from the cyclone tube; and a helical member arranged within the cyclone tube in an opposite region of the cyclone tube with respect to the air outlet. The helical member defines or partly defines a helical passage around the center axis from the inlet channel to the cyclone chamber for generating a centrifugal flow in the cyclone chamber. The helical passage has a substantially constant cross sectional area and the helical passage is rotated 360° or less than 360° around the center axis.

23 Claims, 8 Drawing Sheets

(56) References Cited

U.S. PATENT DOCUMENTS

| | | | |
|---|---|---|---|
| 4,179,273 A | 12/1979 | Montusi | |
| 6,277,163 B1* | 8/2001 | Embree | A47L 5/28 |
| | | | 15/347 |
| 6,332,239 B1 | 12/2001 | Dubos et al. | |
| 6,350,292 B1 | 2/2002 | Lee et al. | |
| 6,706,095 B2 | 3/2004 | Morgan | |
| 2007/0012003 A1 | 1/2007 | Oh et al. | |
| 2007/0271724 A1 | 11/2007 | Hakan et al. | |
| 2008/0289306 A1 | 11/2008 | Han et al. | |
| 2013/0232724 A1* | 9/2013 | Krebs | A47L 9/14 |
| | | | 15/353 |

FOREIGN PATENT DOCUMENTS

| | | |
|---|---|---|
| EP | 1994870 A2 | 11/2008 |
| EP | 2636348 A2 | 9/2013 |
| JP | 53091072 A | 8/1978 |
| JP | 2000157463 A | 6/2000 |
| JP | 2004129783 A | 4/2004 |
| JP | 2011000450 A | 1/2011 |
| WO | 0049932 A1 | 8/2000 |

OTHER PUBLICATIONS

Chinese Office Action for Chinese Application No. 201780082149.0, dated Oct. 12, 2020, 9 pages.
International Search Report and Written Opinion for International Application No. PCT/EP2017/052527, dated Sep. 21, 2017, 10 pages.

* cited by examiner

SEPARATION SYSTEM FOR VACUUM CLEANER AND VACUUM CLEANER COMPRISING THE SEPARATION SYSTEM

This application is a U.S. National Phase application of PCT International Application No. PCT/EP2017/052527, filed Feb. 6, 2017, which is incorporated herein by reference.

TECHNICAL FIELD

The present invention generally relates to a separation system for a vacuum cleaner. In particular, a separation system comprising a cyclone tube and a helical member arranged within the cyclone tube and a vacuum cleaner comprising the separation system are provided.

BACKGROUND

Cyclone type vacuum cleaners are widely known because of their benefit in bagless dust collection. In cyclone type vacuum cleaners, dust is separated in cyclone separators via a cyclone effect. Dust separated in this way is transferred to a dust collecting container.

Dust separating efficiency of cyclone dust separators is still a topic even for known types of cyclone vacuum cleaners. The higher the separation efficiency of the cyclone separation step or steps, the longer the service life of a main filter, generally provided downstream the cyclone stage.

US 2007271724 A1 discloses a hand held vacuum cleaner comprising a tube part slidably arranged in a channel and a dust container having an air inlet and an air outlet arranged adjacent to a first end of the dust container. The dust container constitutes a part of a cyclone separator.

U.S. Pat. No. 6,332,239 B1 discloses a device for collecting dirt intended to equip a vacuum cleaner. The device comprises a first tube with an air intake capable of receiving the air sucked in and an air delivery outlet, a screw substantially axially positioned in the first tube, a second tube with a diameter smaller than the screw external diameter and coaxially located in the first tube extension, in ventilating communication through one end to the first tube delivery end and connected by its other end to the suction unit by a first discharge conduit. The device further comprises a third tube arranged around the second tube and connected to the first tube delivery end so as to provide between the second and third tubes a second conduit for discharging the trash towards a filter and/or a container in a secondary output flow.

Dust separating devices of prior art vacuum cleaners are energy consuming and space consuming. Energy consumption is of particular importance for battery powered vacuum cleaners. In US 2007271724 A1, the channel for accommodating the tube part is space consuming. The device in U.S. Pat. No. 6,332,239 B1 has high losses and the length of the screw is at least two times the internal diameter of the first tube which makes the device voluminous.

SUMMARY

One object of the present disclosure is to provide a separation system for a vacuum cleaner having an improved separation of dust from dust laden air.

A further object of the present disclosure is to provide a separation system for a vacuum cleaner having a reduced pressure drop.

A still further object of the present disclosure is to provide a separation system for a vacuum cleaner having a compact design.

A still further object of the present disclosure is to provide a separation system for a vacuum cleaner having an improved separation of dust from dust laden air, a reduced pressure drop and a compact design.

According to one aspect, there is provided a separation system for a vacuum cleaner, the separation system comprising a cyclone tube having a cyclone chamber and an inner wall having a substantially cylindrical appearance defining a center axis; an inlet channel offset with respect to the center axis for receiving dust laden air; a dust outlet for discharging dust from the cyclone tube; an air outlet for discharging air from the cyclone tube; and a helical member arranged within the cyclone tube in an opposite region of the cyclone tube with respect to the air outlet, the helical member defining or partly defining a helical passage around the center axis from the inlet channel to the cyclone chamber for generating a centrifugal flow in the cyclone chamber; wherein the helical passage has a substantially constant cross sectional area and the helical passage is rotated 360° or less than 360° around the center axis. With the definition that the helical passage is rotated 360° or less than 360° around the center axis is meant that the helical passage has an angular extension around the center axis of 360° or less than 360°, According to one variant, the helical passage is rotated 180° or less than 180° around the center axis.

Dust laden air sucked in through the inlet channel is given a spin around the center axis when passing through the helical passage. Thereby, a vortex is generated in the cyclone chamber and dust and air are separated in the cyclone chamber by cyclonic separation. Heavier dust particles are forced radially outwards in the cyclone chamber and discharged through the dust outlet. The air outlet is preferably substantially centered with respect to the cyclone tube to receive air with smaller particles. A filter and a motor fan unit are further arranged downstream the air outlet.

In many prior art solutions, the cross sectional area of the channel conducting dust laden air into the cyclone separator varies. Such changes of the cross sectional area increase the risk of dust or sucked Objects to stick in the channel. Moreover, each Thane of the cross sectional area generates losses, e.g. pressure drops.

With the separation system according to the present disclosure, as the dust laden air travels through the inlet channel, through the helical passage and to a helical member opening where the helical member opens into the cyclone chamber, there are no, or no substantial, changes in the cross sectional area. In particular, there are no, or no substantial changes in the cross sectional area of the helical passage, i.e. when the airflow turns around the center axis. In this way, the airflow is given a smooth transition from straight airflow to rotating airflow.

By arranging the helical passage to have a substantially constant cross sectional area and arranging the helical passage to rotate 360° or less than 360° around the center axis, a compact separation system is provided that has a reduced pressure drop (<1.5 kPa in some implementations) and an improved separation (>94% in some implementations). Therefore, the separation system particularly improves the performance of battery driven vacuum cleaner. In addition, dust ending up in a filter downstream of the air outlet can be reduced.

Furthermore, by arranging the helical passage to rotate 360° or less than 360° around the center axis, the risk of objects getting stuck in the helical passage is reduced and cleaning of the helical member is facilitated.

Since the dust laden air enters the cyclone tube in the front and exits through the back (the helical member is in communication with the inlet channel and the air outlet is arranged in an opposite region of the cyclone tube), the separation system according to the present disclosure may alternatively be referred to as an axial separation system.

The helical member may comprise a vane member extending radially to the inner wall of the cyclone tube. Furthermore, the helical member may be releasably arranged within the cyclone tube such that the helical member can be removed for cleaning or replacement.

The separation system according to the present disclosure may also comprise a dust collecting container, e.g. a dust bin, for receiving dust from the cyclone tube. The dust collecting container may be detachably connected or integrally formed with the cyclone tube.

The inlet channel may comprise a curved section wherein the helical member and the curved section define the helical passage. In this case, the inlet channel may also comprise a straight section, substantially parallel with the center axis, that transitions to the curved section. Both the straight section and the curved section of the inlet channel may have equal cross sectional area.

The inlet channel, the helical passage and the dust outlet may have substantially equal cross sectional area. In this manner, blockage of the dust outlet can be avoided.

The dust outlet may be positioned along a helical line defined by the helical member at a helical member opening where the helical member opens into the cyclone chamber. In other words, the helical member may be directed towards the dust outlet such that dust laden air hits the dust outlet in a direct as possible fashion. The dust outlet may be positioned at a distance of to 2 times the pitch of the helical line from the helical member opening.

The dust outlet may comprise a diverging surface at an angle to a tangential direction of the inner wall adjacent to the dust outlet e.g., immediately adjacent to the dust outlet. The diverging surface reduces the speed of the dust laden air in the dust outlet. In this way, the turbulence in a dust collecting container can be reduced. The angle of the diverging surface to the tangential direction may be 30° to 60°, such as 40° to 50°.

The helical member may comprise a center piece substantially concentric with the center axis and the cross sectional area of the center piece may increase towards the cyclone chamber along the center axis. The center piece may have a substantially conical appearance. A diameter of the center piece may increase to 30% to 70%, such as to 40% to 60%, such as to 50%, of an inner diameter of the inner wall of the cyclone tube. The helical member may comprise a vane member extending radially from the center piece to the inner wall of the cyclone tube.

The separation system may further comprise a pipe for conducting air from the cyclone chamber to the air outlet. The pipe may be releasably arranged within the cyclone tube.

The pipe may be substantially cylindrical and arranged substantially concentric with the center axis. The pipe may comprise a semipermeable structure such as a mesh. The semipermeable structure may be provided along a length of approximately 50% of the length of the pipe along the center axis.

The pipe and the center piece may be detachably connected or integrally formed. In these cases, the semipermeable structure may be provided along a length of approximately 50% of the length of the pipe along the center axis from the helical member. Thereby, the vane member of the helical member may end adjacent to the semipermeable structure of the pipe.

The helical member may comprise a vane member having a successively decreasing thickness towards the cyclone chamber, i.e. along the downstream path of the helical passage. In this manner, the inclinations of opposing vane member surfaces in the helical passage differ.

The helical member may comprise an inlet surface generally facing, the inlet channel at a downstream end of the vane member and an outlet surface generally facing the air outlet at the downstream end of the vane member; wherein the inlet surface gradually transitions from being substantially parallel with the center axis to an angle of 60° to 80°, such as 70°, to the center axis and the outlet surface gradually transitions from being substantially parallel with the center axis to an angle of 70° to 90°, such as 80°, to the center axis, According to one example, the inlet surface gradually transitions to an angle of substantially 70° and the outlet surface gradually transitions to an angle of substantially 80°.

At one point along the helical passage, both the inlet surface and the outlet surface may be inclined at an angle of 60° to 80°, such as 70°, to the center axis. Downstream from this point along the helical passage, the angle of the inlet surface to the center axis may remain substantially constant while the outlet surface gradually decreases to an angle of 70° to 90°, such as 80°. The outlet surface may reach the angle of angle of 70° to 90°, such as 80°, at the downstream end of the vane member, or upstream of the downstream end of the vane member.

The inlet surface may be angled 60° to 80°, such as 70°, to the center axis, along a major angular extension of the vane member and the outlet surface may be angled 70° to 90°, such as 80°, to the center axis, along a major angular extension of the vane member.

By arranging the inlet surface and the outlet surface of the helical member at different angles to the center axis, a constant cross sectional area of the helical passage can be provided when the center piece has an increasing cross sectional area towards the cyclone chamber along the center axis.

Alternatively, or in addition, the inner wall of the cyclone tube may be cylindrical around the cyclone chamber and slightly conical adjacent to the helical member. In this way, also the inner wall of the cyclone tube may contribute to maintain a substantially constant cross sectional area of the helical passage as the cross sectional area of the center piece gradually increases towards the cyclone chamber.

According to a further aspect, there is provided a vacuum cleaner comprising a separation system according to the present disclosure. A vacuum cleaner according to the present disclosure may be of any type, including but not limiting: stick type vacuum cleaners, 2-in-1 vacuum cleaners, robotic vacuum cleaners and conventional canister vacuum cleaners. Moreover, a vacuum cleaner according to the present disclosure may be either corded or battery driven.

The center axis of the cyclone tube may be arranged either vertically, horizontally or to inclined. According to one variant, the center axis is arranged with a slight inclination to the vertical axis to facilitate the lifting of heavier objects such as pebbles.

As used herein, a substantially constant cross sectional area may be constant or may change less than 15%, such as less than 12%, such as less than 10%, such as less than 5%. A substantially parallel, perpendicular and concentric relationship as used herein may include a perfectly parallel, a perfectly perpendicular and a perfectly concentric relationship as well as deviations therefrom of up to 5%, such as up to 2%.

BRIEF DESCRIPTION OF THE DRAWINGS

Further details, advantages and aspects of the present disclosure will become apparent from the following embodiments taken in conjunction with the drawings, wherein.

DETAILED DESCRIPTION

In the following, a separation system comprising a cyclone tube and a helical member arranged within the cyclone tube and a vacuum cleaner comprising the separation system will be described. The same reference numerals will be used to denote the same or similar structural features.

Figure 1:
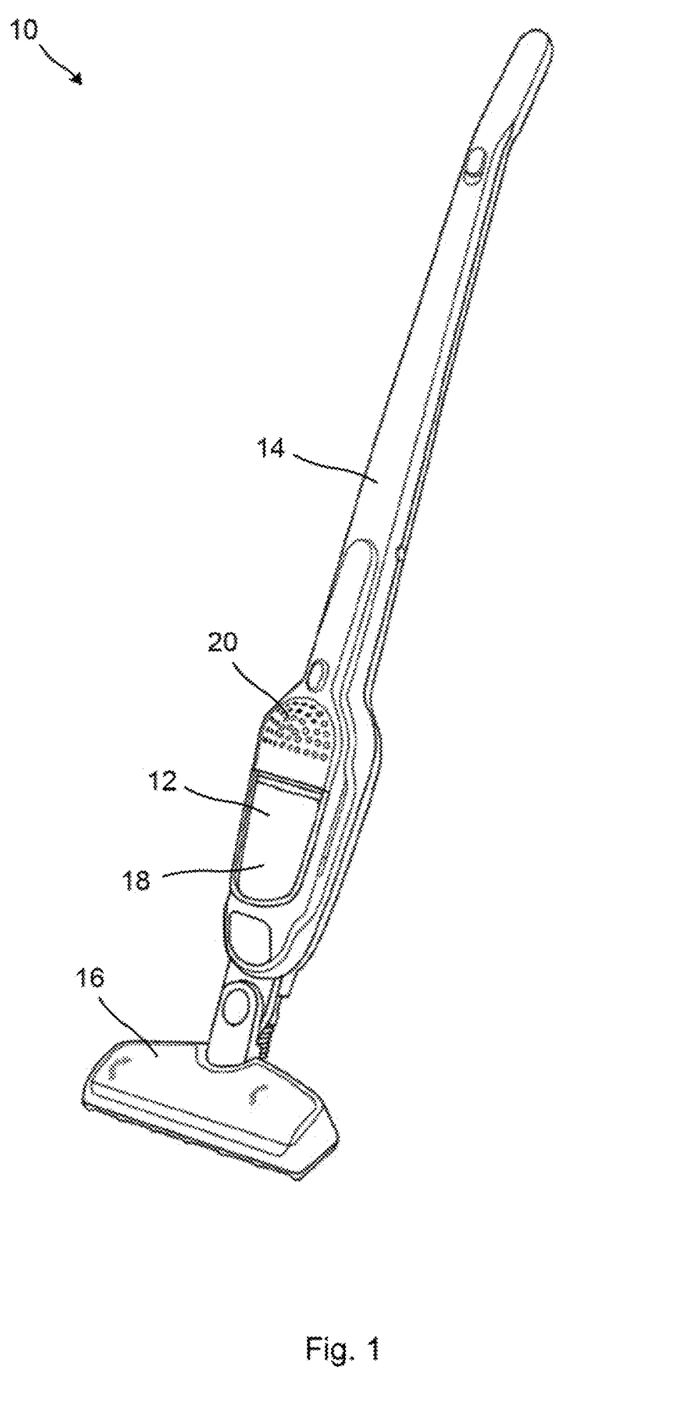
FIG. 1: schematically represents a perspective view of a vacuum cleaner comprising a separation system.

FIG. 1 schematically represents a perspective view of one example of a vacuum cleaner 10 according to the present disclosure. The vacuum cleaner 10 of this example is a 2-in-1 stick type vacuum cleaner. The vacuum cleaner to comprises a separation system 12, stick 14 that transitions into a housing for the separation system 12, a nozzle 16 with an air inlet (not shown), a dust collecting container 18 and air openings 20 for exhausting filtered clean air after having passed a fan unit (not shown).

Figure 2:
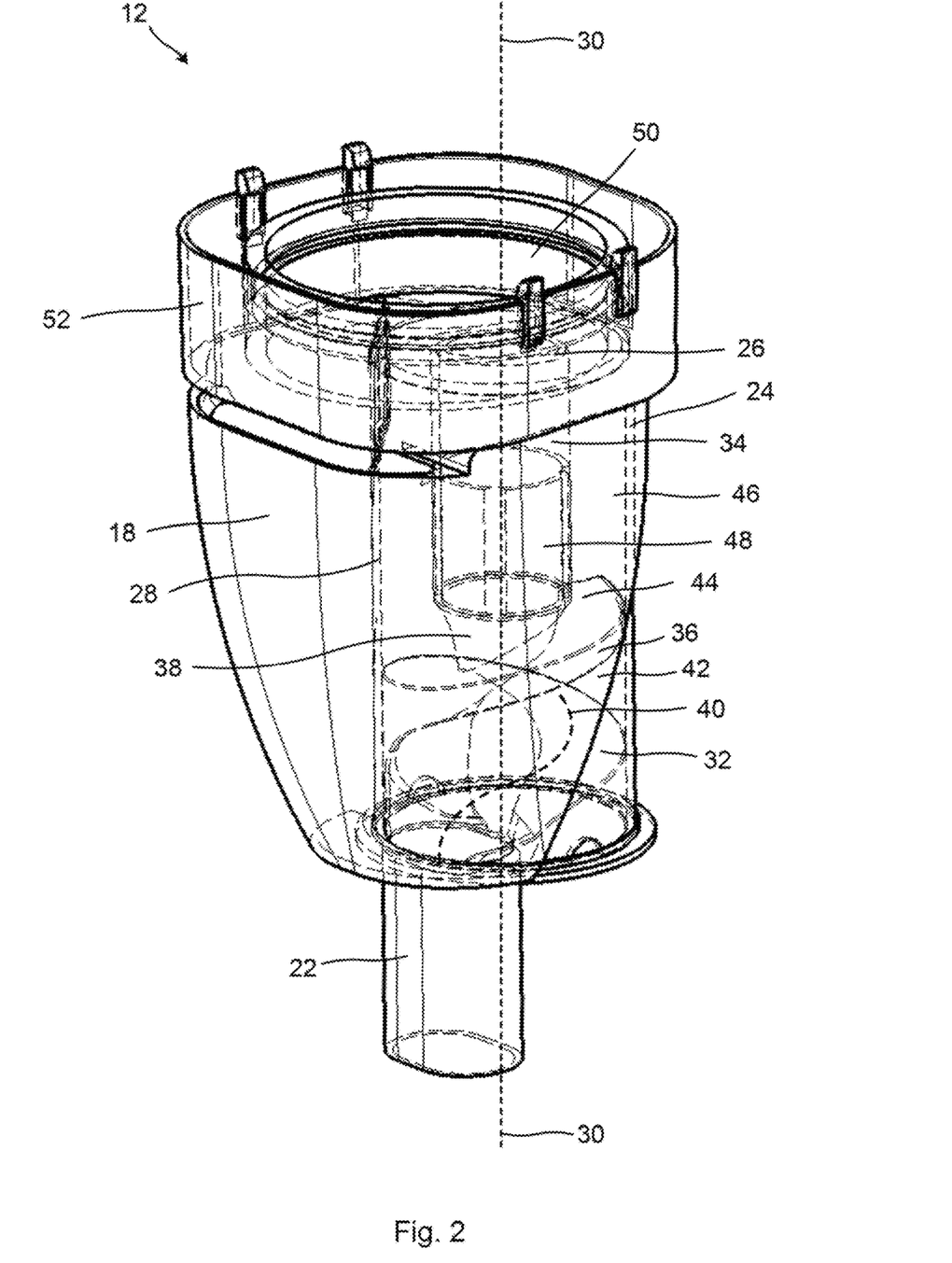
FIG. 2: schematically represents a perspective view of the separation system.

FIG. 2 schematically represents a perspective view of the separation system 12 in FIG. 1. The separation system 12 comprises an inlet channel 22 in fluid communication with the air inlet of the nozzle 16, a cyclone tube 24 and an air outlet 26. The cyclone tube 24 has an inner wall 28 of substantially cylindrical appearance defining a center axis 30. A helical member 32 and a pipe 34 are arranged in the cyclone tube 24.

The helical member 32 is arranged within the cyclone tube 24 in an opposite region of the cyclone tube 24 with respect to the air outlet 26, The separation system 12 further comprises the dust collecting container 18 detachably attached to the cyclone tube 24. The separation system 12 may be arranged in the vacuum cleaner 10 such that the center axis 30 is substantially vertically oriented, slightly inclined with respect to a vertical direction or substantially horizontally oriented.

The helical member 32 comprises a spiral shaped vane member 36 that extends radially outwards to the inner wall 28 of the cyclone tube 24. The bottom face (when the separation system 12 is substantially vertically oriented) of the helical member 32 is circular and matches the bottom of the cyclone tube 24.

Figure 5:
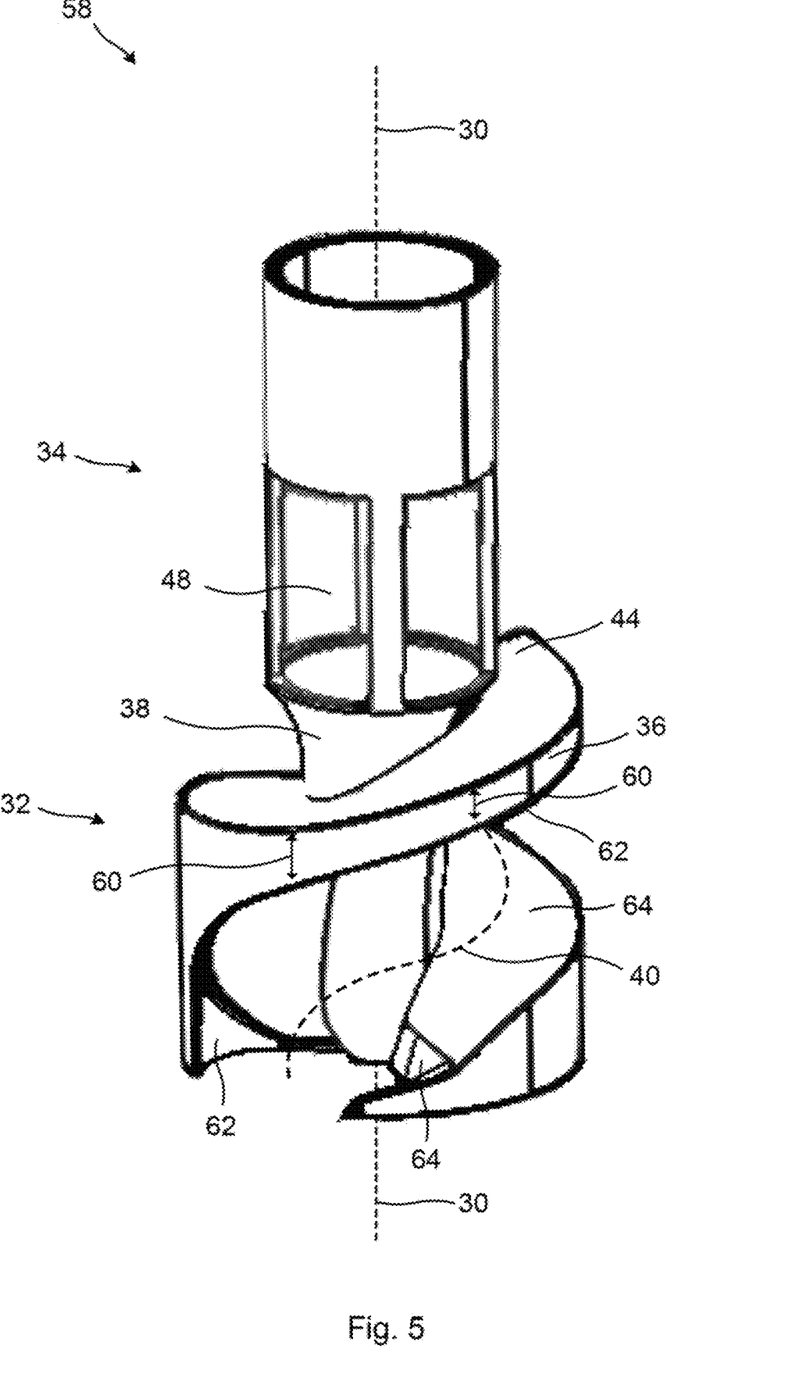
FIG. 5: schematically represents a perspective view of a unit comprising a pipe and a helical member.
Figure 6:
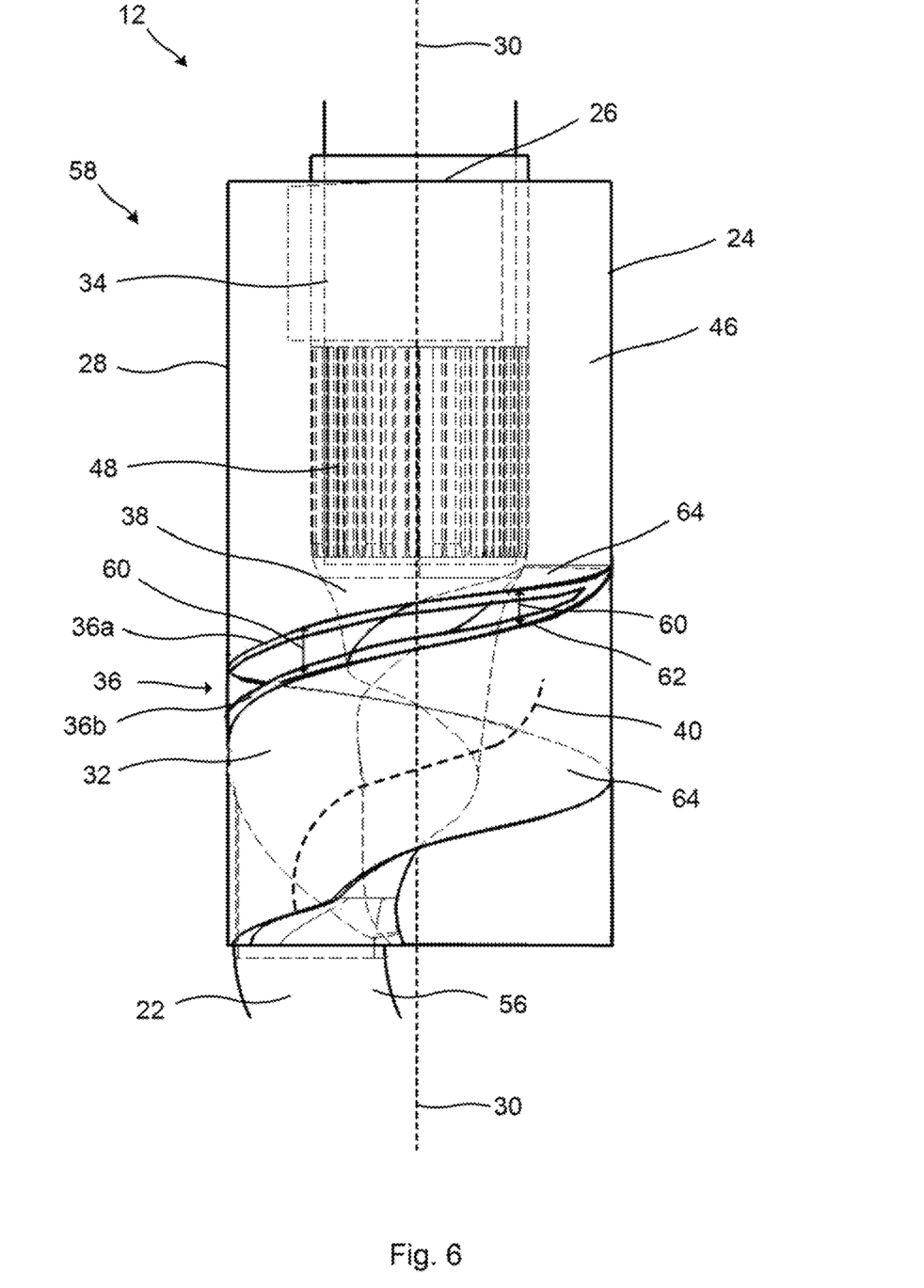
FIG. 6: schematically represents a front view of parts of a separation system comprising an alternative unit comprising a pipe and a helical member.

In the example of FIG. 5, the vane member 36 is solid. The vane member 36 thus only comprises one solid vane. The vane member 36 may however alternatively be constituted by two vanes as shown in FIG. 6.

The helical member 32 further comprises a substantially conical center piece 38. In the example of FIG. 2, the center piece 38 is integrally formed with the vane member 36. The to helical member 32 defines a helical passage 40 having a substantially constant cross sectional area. The cross sectional area of the helical passage 40 is the area perpendicular to a main flow direction within the helical passage 40. The cross sectional area of the helical passage 40 is limited by the vane member 36, the center piece 38 of the helical member 32 and the inner wall 28 of the cyclone tube 24.

The helical passage 40 of this example extends in a spiral shape from the inlet channel 22 to a helical member opening 42 defined by a downstream end 44 of the helical member 32 where the helical passage 40 opens into a cyclone chamber 46 of the cyclone tube 24, Furthermore, the helical passage 40 is rotated maximum 360° (approximately 180° in FIG. 2) around the center axis 30 from the inlet channel 22 to the cyclone chamber 46.

As can be seen in FIG. 2, the inlet channel 22 is straight and substantially parallel with and offset with respect to the center axis 30. It is however also possible that the inlet channel 22 comprises a straight section and a curved section, such that the helical passage 40 begins in the inlet channel 22, see FIG. 3.

The helical member 32 transitions a straight airflow of dust laden air in the inlet channel 22 into a rotating airflow in the cyclone chamber 46. Due to the rotating airflow out from the helical passage 40, a vortex is generated in the cyclone chamber 46 and heavier dust particles are forced radially outwards against the inner wall 28 of the cyclone tube 24.

The cyclone tube 24 further comprises a dust outlet (not shown) arranged at in the inner wall 28 and a pipe 34 arranged substantially concentric with the center axis 30 within the cyclone tube 24. The dust laden air containing the heavier and more coarse dust particles is conducted into the dust collecting container 18 via the dust outlet while the cleaner air containing lighter and finer particles is sucked out through the pipe 34 and then through the air outlet 26.

The pipe 34 comprises a semipermeable structure 48, such as a mesh, that constitutes a first filtration step and blocks particles from entering the pipe 34. The separation system 12 also comprises a further fine filter 50 downstream of the air outlet 26 constituting a to second filtration step.

A lid 52 containing the filter 50 is arranged at the end of the cyclone tube 24 opposite to the helical member 32 (the top end in case the separation system 12 is vertically arranged or substantially vertically arranged). The filter 50 can be removed from the lid 2 for cleaning. When the filter 50 is removed, also the pipe 34 and the helical member 32 can be removed from cyclone tube 24 through the air outlet 26 for cleaning. The pipe 34 and the helical member 32 may be detachably connected. By detaching the pipe 34 from the helical member 32, the cleaning is facilitated. All components of the separation system 12 except the filter 50 may for example be made of plastic.

Figure 3:
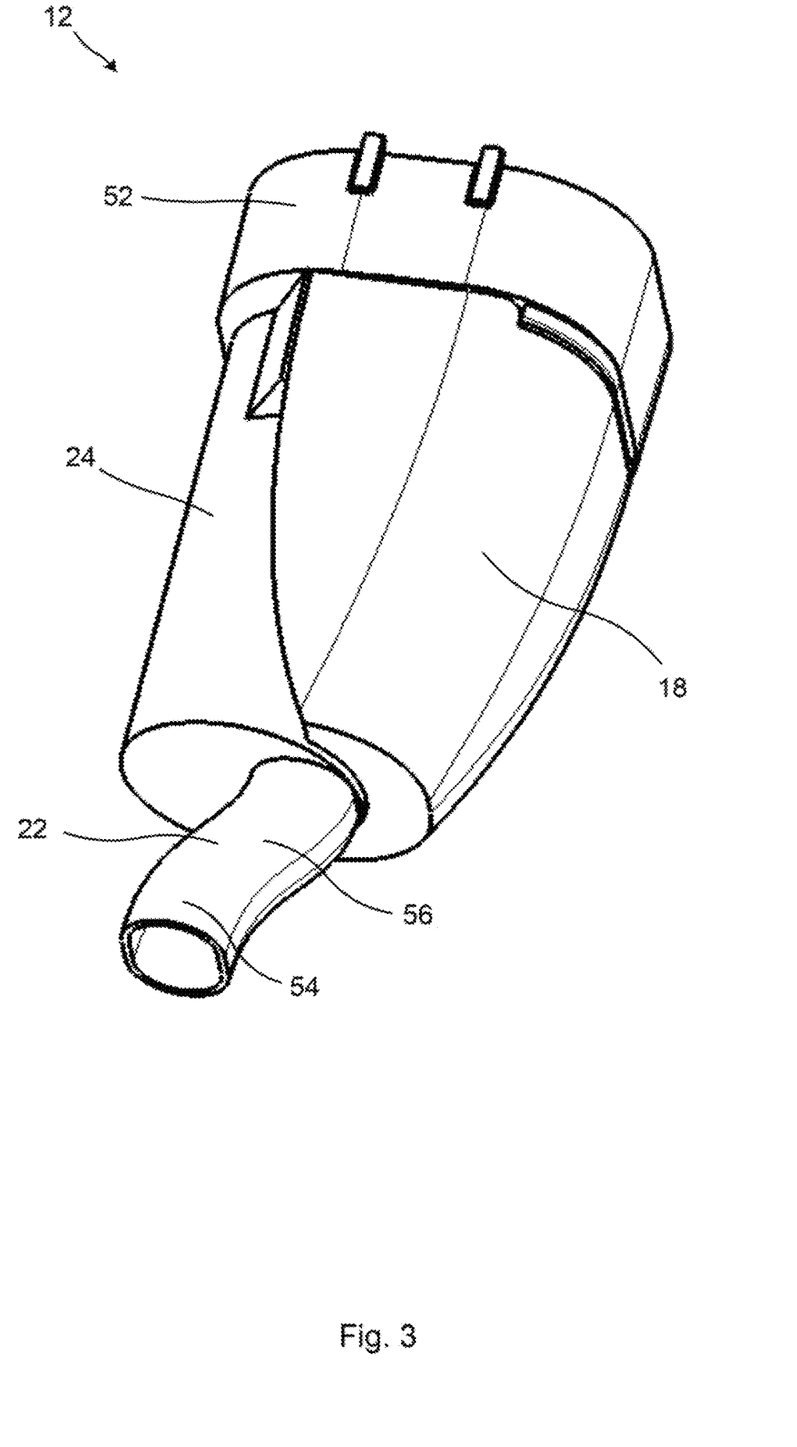
FIG. 3: schematically represents a perspective view of an alternative separation system.

FIG. 3 schematically represents a perspective view of an alternative separation system 12. The separation system 12 in FIG. 3 only differs from the separation system 12 in FIG. 2 in that the inlet channel 22 comprises a straight section 54 and a curved section 56, such that the helical passage 40 (not shown in FIG. 3) begins in the inlet channel 22.

In the alternative separation system 12 of FIG. 3, the helical passage 40 is defined by both the curved section 56 of the inlet channel 22 and the helical member 32. In other words, the helical passage 40 is only partly defined by the helical member 32. Also when the helical passage 40 is defined by both the carved section 56 of the inlet channel 22 and the helical member 32, the helical passage 40 has a substantially constant cross sectional area and the helical passage 40 is rotated maximum 360° around the center axis 30 from the inlet channel 22 (i.e. from the straight section 54 of the inlet channel to the cyclone chamber 46. The straight section 54 of the inlet channel 22 may or may not be concentric with the center axis 30.

Figure 4:
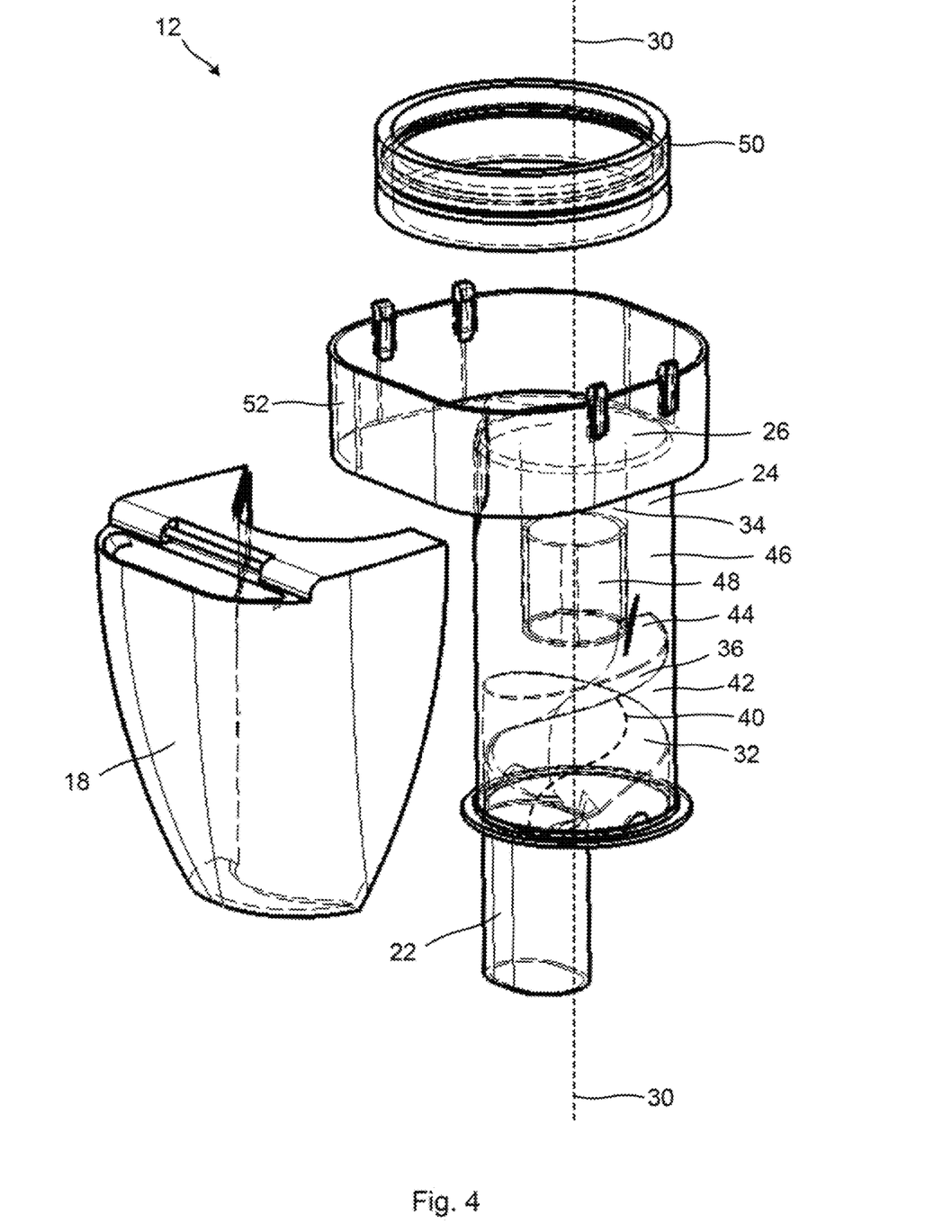
FIG. 4: schematically represents an exploded perspective view of the separation system in FIGS. 1 and 2.

FIG. 4 schematically represents an exploded perspective view of the separation system 12 in FIGS. 1 and 2. The center piece 38 is removed in this view. In FIG. 3, the filter 50 has been removed from the lid 52 and the pipe 34 and the helical member 32 can be removed from the cyclone tube 24 for cleaning. The dust collecting container 18 has been detached from the cyclone tube 24 for emptying and/or cleaning.

FIG. 5 schematically represents a perspective view of a unit 58 comprising of the pipe 34 and the helical member 32. The unit 58 may be used with any separation system 12 according to the present disclosure. The pipe 34 and the helical member 32 may be integrally formed or detachably connectable.

As can be seen in FIG. 5, the center piece 38 is substantially concentric with the center axis 30 and the cross sectional area of the center piece 38 is increasing along the center axis 30. In the upstream region of the helical passage 40, the center piece 38 has a smaller cross sectional area and adjacent to the downstream end 44 of the vane member 36, the center piece 38 has a larger cross sectional area. The center piece 38 in FIG. 5 has a substantially conical appearance.

FIG. 5 further shows that the vane member 36 of the helical member 32 has a successively decreasing thickness 60 towards the downstream end 44 of the vane member 36. The thickness 60 of the vane member 36 is the dimension of the vane member 36 in a direction parallel to the center axis 30.

The helical member 32 comprises an inlet surface 62 generally facing the inlet channel 22 (facing downwards in FIG. 5) and an outlet surface 64 generally facing the air outlet 26 (facing upwards in FIG. 5) when the helical member 32 is inserted into the cyclone tube 24. The inlet surface 62 transitions from being substantially parallel with the center axis 30 to an angle of approximately 70° to the center axis 30. The outlet surface 64 transitions from being substantially parallel with the center axis 30 to a steeper angle, in FIG. 5 to an angle of approximately 80° to the center axis 30. In this manner, the vane member 36 is formed to have a successively decreasing thickness 60 towards the downstream end 44 of the vane member 36.

Thus, even if the conical center piece 38 occupies more and more volume of the helical passage 40 due to its increasing cross sectional area, this is compensated by the successively decreasing thickness 60 of the vane member 36 towards the downstream end 44 of the vane member 36. In other words, by arranging the inlet surface 62 and the outlet surface 64 of the helical member 32 at different angles to the center axis 30, the dimension of the helical passage 40 in a direction parallel to the center axis 30 is increased towards the downstream end 44 of the vane member 36. Thereby, a constant cross sectional area of the helical passage 40 can be maintained when the center piece 38 has an increasing cross sectional area towards the cyclone chamber 46. The cross sectional area of the center piece 38 at the downstream end 44 of the vane member 36 matches the cross sectional area of the pipe 34. In this manner, the unit 58 is given compact design and an effective generation of a vortex within the cyclone chamber 46.

FIG. 5 further shows that the semipermeable structure 48 is provided along a length of approximately 50% of the length of the pipe 34 along the center axis 30. The semipermeable structure 48 of the pipe 34 is provided along a length of approximately 50% of the length of the pipe 34 along the center axis 30 from the helical member 32. The vane member 36 of the helical member 32 ends adjacent to the semipermeable structure 48 of the pipe 34.

FIG. 6 schematically represents a front view of parts of a separation system 12 comprising an alternative unit 58 comprising a pipe 34 and a helical member 32. Mainly differences with respect to FIG. 5 will be described.

In the example of FIG. 6, the vane member 36 comprises two separate vanes 36a, 36b. A first vane 36a (tippet vane in FIG. 6) forms the outlet surface 64 of the helical member 32 and a second vane 36b (lower vane in FIG. 6) forms the inlet surface 62 of the helical member 32. Each vane 36a, 36b is flat. However, also the vane member 36 in FIG. 6 has a successively decreasing thickness 6o since the vanes 36a, 36b of the vane member 36 are brought closer to each other in the downstream direction. Thus, the thickness 60 of the vane member 36 is in this example also constituted by the distance between the vanes 36a, 36b.

Figure 7:
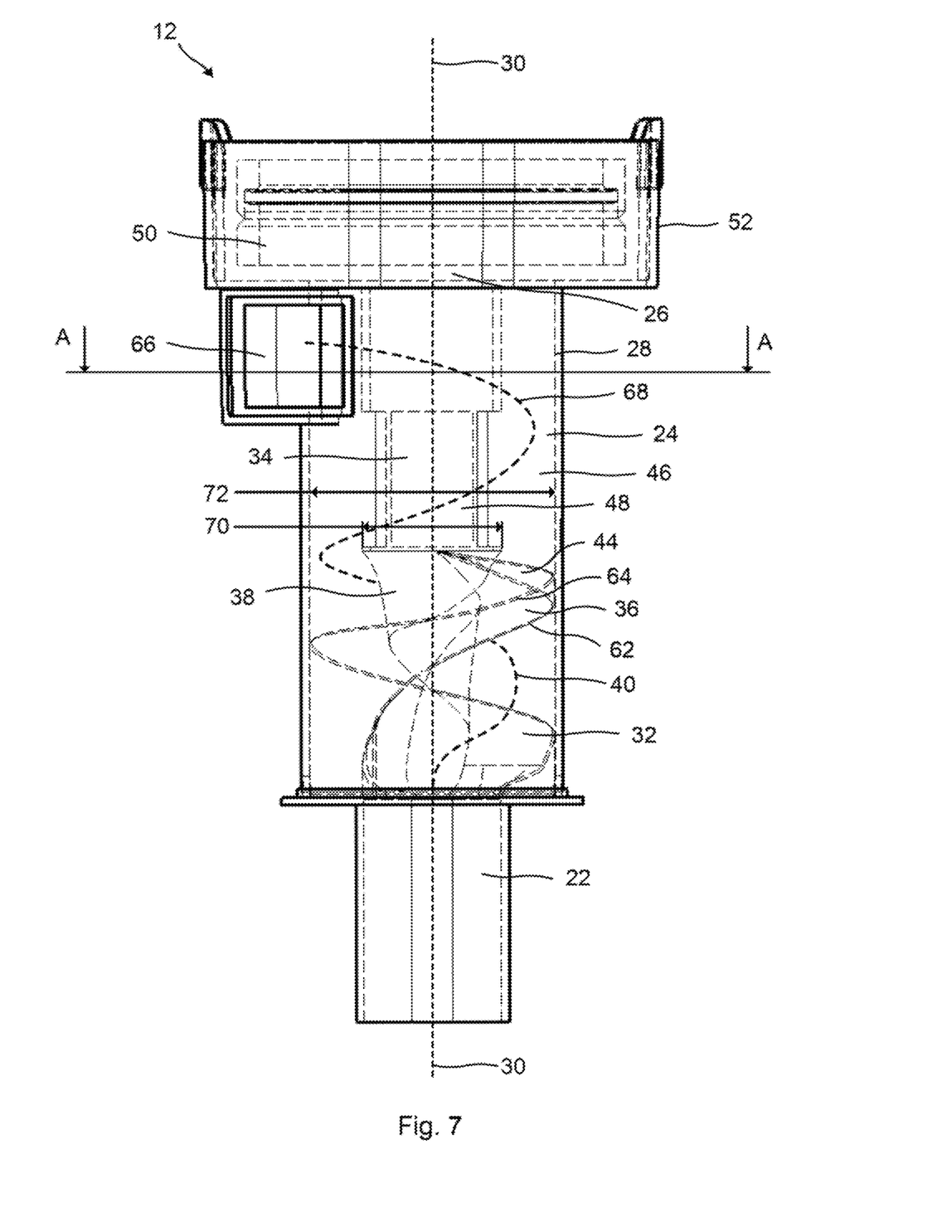
FIG. 7: schematically represents a front view of the separation system in FIGS. 1, 2 and 4.

FIG. 7 schematically represents a front view of the separation system 12 in FIGS. 1, 2 and 4. In FIG. 7, the dust outlet 66 of the separation system 12 can be seen. In this example, the inlet channel 22, the helical passage 40 and the dust outlet 66 have substantially equal cross sectional area.

FIG. 7 further shows that the helical member 32 defines a helical line 68 at the helical member opening 42 (hidden behind the vane member 36 and the center piece 38 in FIG. 7). More specifically, the helical line 68 is a line defined by the inlet surface 62 and the to outlet surface 64 of the helical member 32 at the helical member opening 42. The angle of the helical line 68 to the center axis 30 is the mean value of the respective inlet surface 62 and the outlet surface 64 at the helical member opening 42.

Of course, not all dust will travel along the helical line 68 during operation of the vacuum cleaner to but the helical line 68 defines a main flow of dust around the pipe 34 and serves as a guide to position the dust outlet 66 for an increased collection of dust. The dust outlet 66 is positioned in the inner wall 28 at a position along the helical line 68. In the example of FIG. 7, the dust outlet 66 is positioned approximately 1.25 turns (450°) from the helical member opening 42 and approximately 1.25 times the pitch of the helical line 68 from the helical member opening 42. According to the present disclosure, the dust outlet 66 may for example be positioned at a distance (height in FIG. 7) of 1 to 2 times the pitch of the helical line 68 from the helical member opening 42. In this manner, dust can more effectively enter the dust outlet 66 for collection in the dust collection container 18.

FIG. 7 further shows that the diameter 70 of the center piece 38 increases along the center axis 30 up to approximately 50% of the of the inner diameter 72 of the inner wall 28 of the cyclone tube 24.

Figure 8:
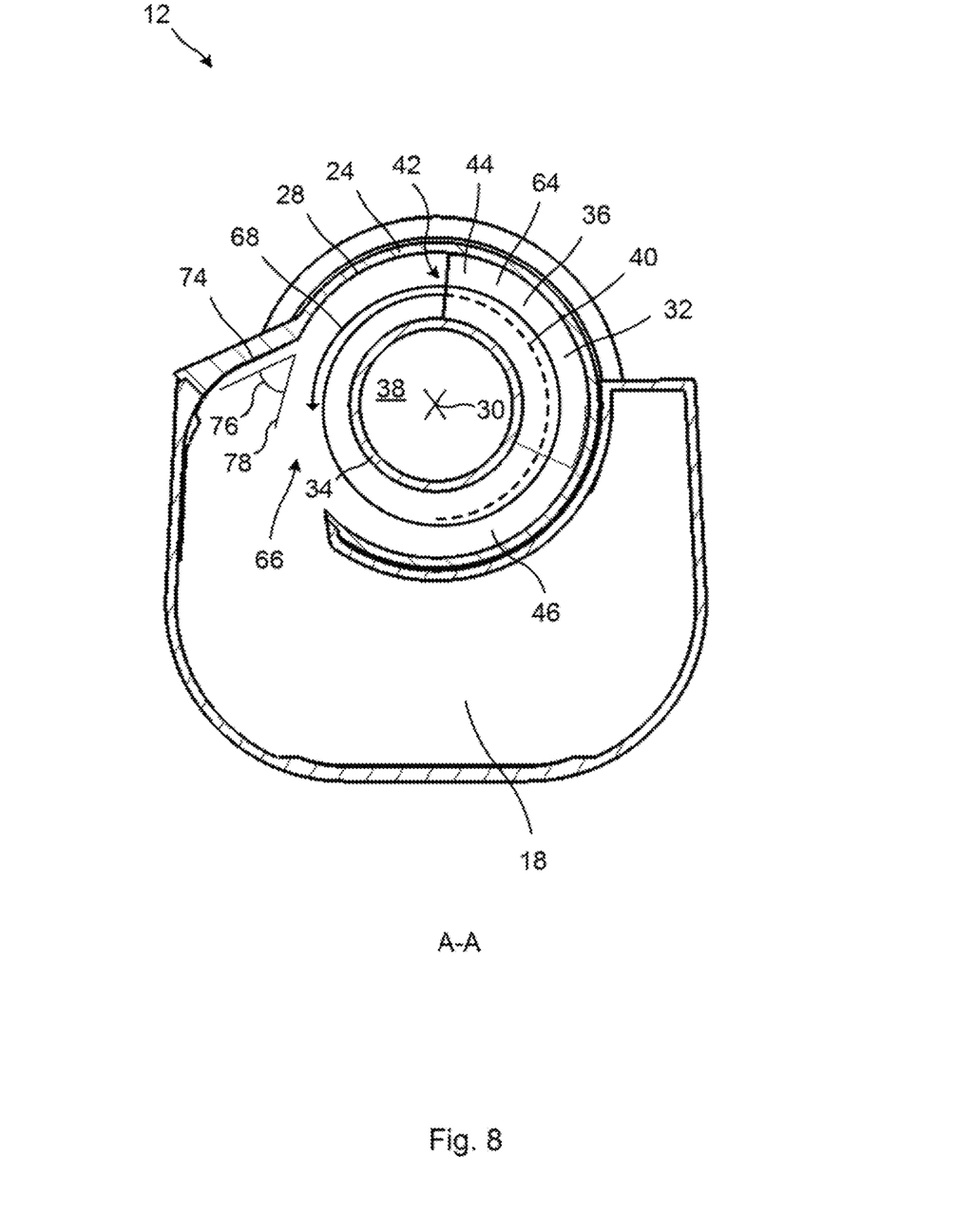
FIG. 8 schematically represents a cross sectional top view of the separation system in FIG. 7.

FIG. 8 schematically represents a top view of the separation system 12 in cross section A-A in FIG. 7. As can be seen in FIG. 8, the dust outlet 66 comprises a diverging surface 74 at an angle 76 to a tangential direction 78 of the inner wall 28 adjacent to the dust outlet 66. In this example, the diverging surface 74 is integrally formed with the cyclone tube 24. However, the diverging surface 74 may alternatively be provided in the dust collecting container 18 (which may be detachable from the cyclone tube 24).

The diverging surface 74 is constituted by a substantially flat surface having a normal substantially perpendicular to the center axis 30 of the inner wall 28 of the cyclone tube 24. In this example, the diverging surface 74 is angled approximately 45° with respect to the tangential direction 78 of the inner wall 28 adjacent to the dust outlet 66, The diverging surface 74 widens the dust outlet 66 such that the speed of the dust laden airflow is reduced when entering the dust outlet 66. As a consequence, the turbulence in the dust collecting container 18 is reduced and the risk of dust going back into the cyclone chamber 46 is reduced.

In operation, the vacuum cleaner 10 draws dust laden air into to the inlet channel 22 of the separation system 12. Either in the helical member 32, or in the inlet channel 22 and the helical passage 40 of the helical member 32, the straight airflow is smoothly transitioned into a rotating airflow. Since the cross sectional area of the inlet channel 22 and the helical passage 40 are constant, the occurrence of pressure drops is decreased.

The opposing inlet surface 62 and outlet surface 64 of the helical member 32 have varying inclinations such that the thickness 6o of the vane member 36 gradually decreases. Thereby, the cross sectional area of the center piece 38 of the helical member 32 is allowed to increase along the center axis 30 up to the cross sectional area of the pipe 34 without changing the cross sectional area of the helical passage 40. This, together with the relatively short helical passage 40, up to one turn around the center axis 30, contribute to a compact configuration of the separation system 12 that generates an efficient vortex for separation of dust in the cyclone chamber 46. By arranging the helical passage 40 to "point" towards the dust outlet 66 and by providing a diverging surface 74 in the dust outlet 66, the efficiency of dust separation can be further improved.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A separation system for a vacuum cleaner, the separation system comprising:
a cyclone tube having a cyclone chamber and an inner wall having a substantially cylindrical appearance defining a center axis;
an inlet channel offset with respect to the center axis for receiving dust laden air; a dust outlet for discharging dust from the cyclone tube;
an air outlet for discharging air from the cyclone tube; and
a helical member arranged within the cyclone tube in an opposite region of the cyclone tube with respect to the air outlet, the helical member defining or partly defining a helical passage around the center axis from the inlet channel to the cyclone chamber for generating a centrifugal flow in the cyclone chamber;
wherein the helical passage has a substantially constant cross sectional area and the helical passage is rotated 360° or less than 360° around the center axis; and
wherein the helical member comprises a center piece substantially concentric with the center axis and wherein the cross sectional area of the center piece increases towards the cyclone chamber along the center axis.

2. The separation system according to claim 1, wherein the inlet channel comprises a curved section and wherein the helical member and the curved section define the helical passage.

3. The separation system according to claim 1, wherein the inlet channel, the helical passage and the dust outlet have substantially equal cross sectional area.

4. The separation system according to claim 1, wherein the dust outlet passes through the inner wall and is positioned along a helical line defined by the helical member at a helical member opening where the helical member opens into the cyclone chamber.

5. The separation system according to claim 4, wherein the dust outlet is positioned at a distance of 1 to 2 times the pitch of the helical line from the helical member opening.

6. The separation system according to claim 1, wherein the dust outlet comprises a diverging surface at an angle to a tangential direction of the inner wall adjacent to the dust outlet.

7. The separation system according to claim 6, wherein the angle of the diverging surface to the tangential direction is 40° to 50°.

8. The separation system according to claim 6, wherein the angle of the diverging surface to the tangential direction is 30° to 60°.

9. The separation system according to claim 1, wherein the center piece has a substantially conical appearance.

10. The separation system according to claim 1, wherein a diameter of the center piece increases to 30% to 70% of an inner diameter of the inner wall of the cyclone tube.

11. The separation system according to claim 1, wherein a diameter of the center piece increases to 40% to 60% of an inner diameter of the inner wall of the cyclone tube.

12. The separation system according to claim 1, wherein a diameter of the center piece increases to 50% of an inner diameter of the inner wall of the cyclone tube.

13. The separation system according to claim 1, further comprising a pipe for conducting air from the cyclone chamber to the air outlet.

14. The separation system according to claim 13, wherein the helical member comprises a center piece substantially concentric with the center axis and wherein the cross sectional area of the center piece increases towards the cyclone chamber along the center axis, and wherein the pipe and the center piece are detachably connected or integrally formed.

15. The separation system according to claim 1, wherein the inlet channel is spaced from the cyclone chamber along the center axis, and the helical member comprises a vane member having a successively decreasing thickness along the center axis towards the cyclone chamber.

16. The separation system according to claim 15, wherein the helical member comprises:
an inlet surface generally facing the inlet channel at a downstream end of the vane member; and
an outlet surface generally facing the air outlet at the downstream end of the vane member;
wherein the inlet surface gradually transitions from being substantially parallel with the center axis to an angle of 60° to 80° to the center axis and the outlet surface gradually transitions from being substantially parallel with the center axis to an angle of 70° to 90° to the center axis.

17. The separation system according to claim 16, wherein the inlet surface gradually transitions from being substantially parallel with the center axis to an angle of 70° to the center axis.

18. The separation system according to claim 16, wherein the outlet surface gradually transitions from being substantially parallel with the center axis to an angle of 80° to the center axis.

19. The separation system according to claim 1, wherein the inlet is configured to direct air into the cyclone chamber in a direction extending parallel to the center axis.

20. The separation system according to claim 1, wherein the air dust outlet extends through the inner wall of the cyclone tube in a radial direction perpendicular to the central axis, and the air outlet extends axially from the cyclone tube along the center axis.

21. The separation system according to claim 20, further comprising a dust collecting chamber removable attached to the cyclone tube and covering the dust outlet.

22. A separation system for a vacuum cleaner, the separation system comprising:
- a cyclone tube having a cyclone chamber and an inner wall having a substantially cylindrical appearance defining a center axis;
- an inlet channel offset with respect to the center axis for receiving dust laden air; a dust outlet for discharging dust from the cyclone tube;
- an air outlet for discharging air from the cyclone tube; and
- a helical member arranged within the cyclone tube in an opposite region of the cyclone tube with respect to the air outlet, the helical member defining or partly defining a helical passage around the center axis from the inlet channel to the cyclone chamber for generating a centrifugal flow in the cyclone chamber;
- wherein the helical passage has a substantially constant cross sectional area and the helical passage is rotated 360° or less than 360° around the center axis; and
- wherein the inlet channel is spaced from the cyclone chamber along the center axis, and the helical member comprises a vane member having a successively decreasing thickness along the center axis towards the cyclone chamber.

23. A separation system for a vacuum cleaner, the separation system comprising:
- a cyclone tube having a cyclone chamber and an inner wall having a substantially cylindrical appearance defining a center axis;
- an inlet channel offset with respect to the center axis for receiving dust laden air; a dust outlet for discharging dust from the cyclone tube;
- an air outlet for discharging air from the cyclone tube; and
- a helical member arranged within the cyclone tube in an opposite region of the cyclone tube with respect to the air outlet, the helical member defining or partly defining a helical passage around the center axis from the inlet channel to the cyclone chamber for generating a centrifugal flow in the cyclone chamber;
- wherein the helical passage has a substantially constant cross sectional area and the helical passage is rotated 360° or less than 360° around the center axis; and
- wherein the air dust outlet extends through the inner wall of the cyclone tube in a radial direction perpendicular to the central axis, and the air outlet extends axially from the cyclone tube along the center axis.

* * * * *